United States Patent [19]
Alexander

[11] Patent Number: 5,511,267
[45] Date of Patent: Apr. 30, 1996

[54] DOCK LEVELER HYDRAULIC CIRCUIT

[75] Inventor: James C. Alexander, London, Canada

[73] Assignee: The Serco Corporation, London, Canada

[21] Appl. No.: 371,565

[22] Filed: Jan. 11, 1995

Related U.S. Application Data

[63] Continuation-in-part of Ser. No. 284,248, Aug. 2, 1994.

[51] Int. Cl.⁶ .................................................... E01D 1/00
[52] U.S. Cl. .................................................... 14/71.7
[58] Field of Search ........................... 14/71.1, 71.3, 14/71.7

[56] References Cited

U.S. PATENT DOCUMENTS

| | | | |
|---|---|---|---|
| 4,081,874 | 4/1978 | Artzberger . | |
| 4,744,121 | 5/1988 | Swessel et al. | 14/71.7 |
| 4,944,062 | 7/1990 | Walker | 14/71.3 |
| 4,955,923 | 9/1990 | Hageman | 14/71.7 |
| 4,977,635 | 12/1990 | Alexander | 14/71.3 |
| 4,979,253 | 12/1990 | Alexander | 14/71.7 |
| 5,205,010 | 4/1993 | Hageman . | |

*Primary Examiner*—Ramon S. Britts
*Assistant Examiner*—James A. Lisehora
*Attorney, Agent, or Firm*—Sughrue, Mion, Zinn, Macpeak & Seas

[57] ABSTRACT

A dock leveler having a deck assembly, a first hydraulic cylinder to power said deck assembly to a raised position, lip mounted to said deck assembly, and a second hydraulic cylinder for powering said lip into an extended position. An hydraulic power circuit is coupled to the first and second hydraulic cylinders to control movement of said deck and lip. The hydraulic power circuit includes a pump to deliver fluid under pressure, a first valve operatively coupled to the pump to control fluid flow to the first hydraulic cylinder. A second valve is operatively coupled to the second hydraulic cylinder. An adjustable relief valve is coupled to the second valve to prevent a reduction of fluid pressure to the second hydraulic cylinder after the pump has supplied fluid under pressure through the second valve to extend the lip.

7 Claims, 4 Drawing Sheets ic circuit

DOCK LEVELER HYDRAULIC CIRCUIT

BACKGROUND OF THE INVENTION

This application is a continuation-in-part to U.S. patent application Ser. No. 08/284,248, filed Aug. 2, 1994 and entitled "Dock Leveler Hydraulic Circuit".

A conventional dock leveler has a deck assembly which stores horizontally and level with the dock floor. It has a pivoting lip which extends outward to rest on the vehicle which is being loaded. The lip provides the bridge between the vehicle and the leveler deck to allow material transfer operations to occur. When the dock leveler is stored, the lip pivots to a pendant position. Usually the end of the lip rests in lip keepers on the stationary frame and supports the front of the deck assembly in the stored position. There are many different systems used to control the motion of the lip, from mechanical linkages to hydraulic cylinders. As examples of systems used to control hydraulic dock levelers, reference is made to U.S. Pat. Nos. 4,081,874; 4,744,121; 4,955,923 and 5,205,010.

This invention relates to a dock leveler which uses hydraulic cylinders to control the position of both the deck assembly and the lip assembly. A typical dock leveler has a larger "main cylinder" to lift the deck assembly and a smaller "lip cylinder" to control the lip position. There are two common methods of controlling the lip, namely "gravity fall" and "powered-in". The more common method is "gravity fall" where the lip is held extended by the lip cylinder until the leveler rests on the vehicle. When the loading operation has been completed, the deck assembly is raised by the main cylinder and the lip falls by gravity to the pendant position. When operating conditions are ideal, the "gravity fall" lip works well. However, dock levelers operate in a harsh environment of industrial loading platforms where dirt, corrosion, ice or snow may prevent the lip from falling. If the lip does not fully retract to rest in the lip keepers, the leveler cannot be stored in the cross-traffic position.

If the dock leveler has an optional "automatic return" feature and the vehicle leaves the dock before the dock leveler has been restored, the deck assembly will fall by gravity to rest on the frame of the dock leveler. The power unit will then automatically start and lift the dock leveler until the lip is fully retracted, or until a preset time has elapsed. If the lip does not fully retract, the hydraulic unit may continue run indefinitely and cause overheating and damage to the unit.

The "powered-in" method is similar in operation to the gravity fall except the lip cylinder is "double acting". That is, when hydraulic pressure is applied to the piston side, the lip will extend and when pressure is applied to the rod side, the lip will retract. When the lip is being extended both methods operate the same. But when the dock leveler is being restored from the operative position with the lip resting on a vehicle, a "powered-in" hydraulic circuit will apply hydraulic pressure to the rod side of the lip cylinder and force the lip to retract, overcoming the friction of corrosion and foreign material in the lip hinge.

The disadvantage of the "powered-in" system is that the pressure of the lip trying to retract as the deck is raised from the bed of the vehicle can result in undesirable scuffing of the bed of the vehicle. This is of particular concern with trailers having an aluminum bed. The second problem is "lip droop", that is, the tendency of the lip to retract slightly from full extension each time the power unit stops. This may prevent proper placement of the lip on the vehicle bed. Lip droop is a consequence of the loss of hydraulic fluid from the secondary circuit caused by a time delay from the pump stopping to the time when the pilot-operated check valve has fully closed. Lip droop is evident in most hydraulic dock levelers, but the amount of droop is significantly greater with the powered-in design because of the hydraulic pressure urging the lip cylinder to retract.

SUMMARY OF THE INVENTION

This invention overcomes both disadvantages of the "powered-in" lip hydraulic system by the addition of a pressure relief valve in the lip retract circuit to prevent lip droop and to control the speed of lip retraction. Although speed control is usually achieved by a variable restriction, flow rate will vary significantly with temperature change, and the restriction cannot prevent lip droop. The adjustable pressure relief valve provides both functions. Additionally, the pressure relief valve works essentially independent of temperature variations. Thus, operation of the system is independent of climatic changes allowing the system to be tuned and operate satisfactorily thereafter.

In accordance with this invention, enhanced operation of the lip extension occurs by isolation of the check valve from the lip extension circuit so that the entire pump flow is directed to the lip extend port.

This invention will be described in greater detail by reference to the attached drawing and the description of the preferred embodiment that follows.

DESCRIPTION OF PREFERRED EMBODIMENTS

Figure 1:
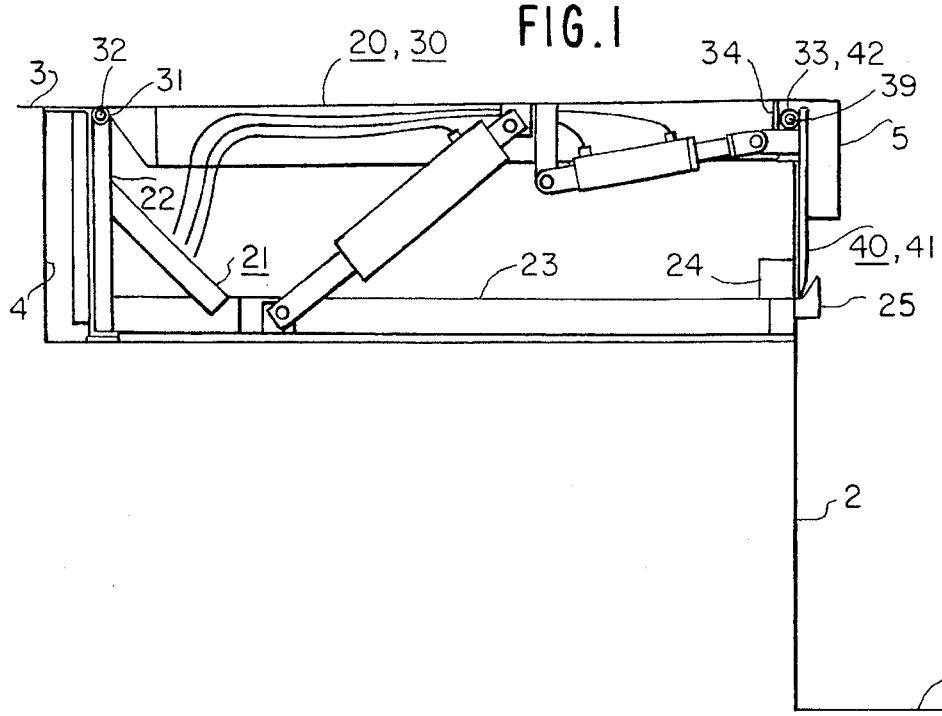
FIG. 1 is a side view of a dock leveler in the stored position.
Figure 2:
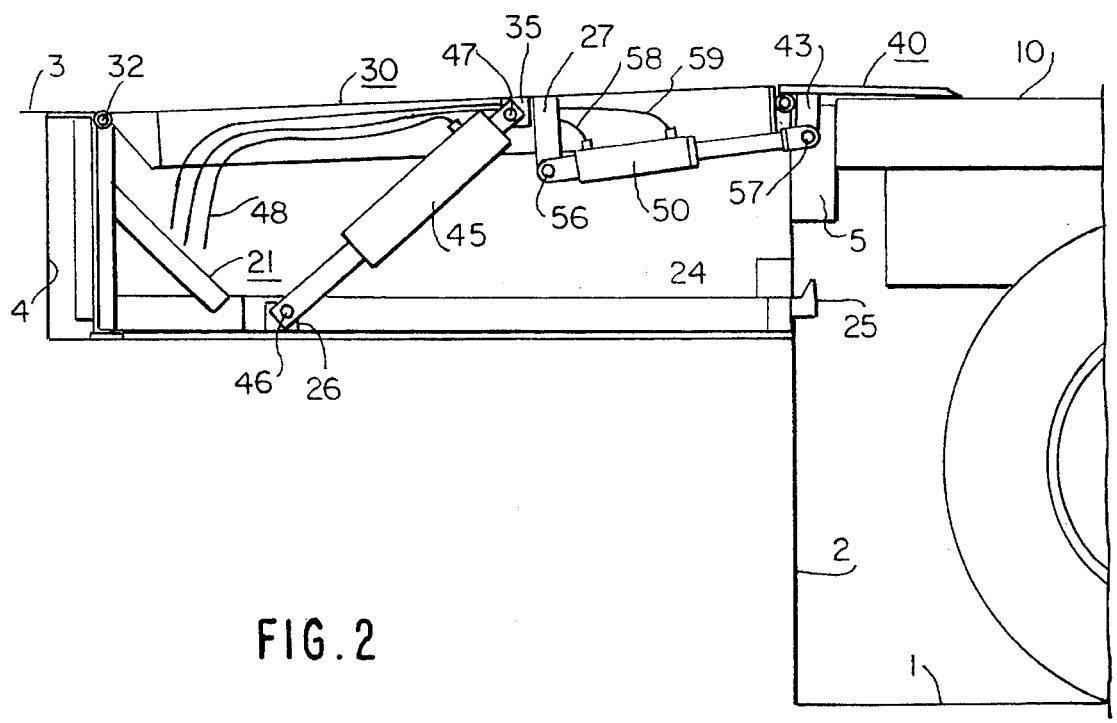
FIG. 2 is a side view of a dock leveler in the operative position with the lip extended on to vehicle.

Referring now to FIGS. 1 and 2 a side view of a loading dock is depicted which has a driveway surface 1, a dock face 2 and a dock floor 3. A pit 4 is formed in the dock floor. Dock bumpers 5 limit the position of the transport vehicle 10. A dock leveler 20 has a frame assembly 21 attached to the pit. The frame assembly has vertical back frame members 22 with holes for the hinge pivot pin near the top. Horizontal frame members 23 extend forward to the front of the pit 4 and have ramp stops 24 and lip keepers 25. A deck assembly 30 has a rear hinge supports 31. The deck assembly 30 is attached to the frame assembly 21 by a hinge pin 32.

Lip hinge tubes 33 are fastened to the front bar 34 of the deck assembly. A lip assembly 40 has a lip plate 41 and hinge tubes 42, and is connected to the deck hinge tubes by a lip hinge pin 39. The end of the lip rests in the lip keepers 25 and supports the deck assembly in the stored "cross-traffic" position.

Figure 3:
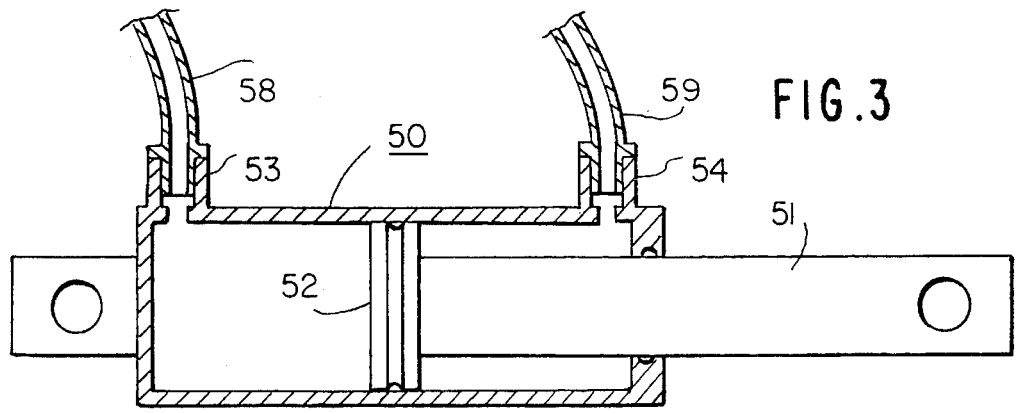
FIG. 3 is a sectional view of the lip cylinder.

FIG. 2 illustrates the dock leveler with the lip extended and resting on the bed of a vehicle 10. A hydraulic cylinder 45 is fastened to brackets 26 on the frame assembly 21 by a pin 46 and to brackets 35 on the deck assembly by a pin 47. A hose 48 carries hydraulic fluid from the power unit 60 (shown schematically on FIG. 4) to the cylinder 45. While a double acting cylinder is illustrated, this invention is also applicable to a single acting lip cylinder. A lip cylinder 50 is fastened to bracket 27 on the frame assembly by a pin 56 and to the arm 43 on the lip assembly 40 by a pin 57. Hoses 58 and 59 carry hydraulic fluid from the power unit 60 to the lip cylinder 50. FIG. 3 is a sectional view of the lip cylinder 50. A rod 51 is attached to a piston 52. The hose 58 is attached to the port 53 and directs hydraulic fluid to the piston side of the cylinder to extend the rod. The hose 59 is attached to the port 54 and directs hydraulic fluid to the rod side of the cylinder to retract the rod. Various means may be used to secure the hoses 58,59 to the ports 53, 54.

The hydraulic power unit 60 (shown schematically in FIG. 4) comprises a hydraulic pump 62, a motor 61 to drive the pump, and several valves which control the hydraulic fluid. The general configuration of this circuit is typical of an hydraulic dock leveler but it has unique attributes according to this invention. The motor 61 drives the pump 62 which draws fluid from the reservoir 63 and through a filter 64. The relief valve 65 prevents damage to the pump by allowing the hydraulic fluid to flow back to the reservoir if the pressure exceeds a preset limit. The shuttle valve 66 has two operating positions. The dotted lines 67 and 68 represent small passages, i.e. pilot lines which allow hydraulic pressure to shift the shuttle valve 67 from one position to the other. The check valve 69 has a ball 70 and a seat 71. Hydraulic fluid can flow through the check valve by lifting the ball 70 away from the seat 71, but pressure in the opposite direction will force the ball against the seat and prevent flow in the reverse direction. Typically there is also a spring (not shown) to bias the ball into contact with the seat.

The shuttle valve 66 and check valve 69 control flow of hydraulic fluid through the primary port 74 to the main cylinder 45 which raises the deck assembly 30. An adjustable flow control valve 73 controls the rate of descent of the deck as it falls by gravity. The portion of the hydraulic circuit which controls the main cylinder 45 is commonly referred to as the "primary circuit".

The "secondary circuit" is the portion which controls the lip cylinder 50. The sequence valve 75 has two operating positions. An adjustable spring 76 holds the valve in the normal position and hydraulic pressure through the pilot line 77 causes the valve to shift to the second position. In accordance with a first aspect of this invention, the motion of the lip cylinder is controlled by the sequence valve 75, the check valve 78 and the pilot-operated check valve 79. The pilot-operated check valve 79 is opened by hydraulic pressure from the pilot line 80 whenever the pump 62 is operating. Hydraulic pressure is directed to extend the lip cylinder through the secondary port 81. An adjustable relief valve 88 is placed in the return line from the lip circuit between the pilot-operated check valve 79 and the reservoir. The relief valve is used to control the speed of lip retraction and to prevent lip droop from fluid loss as the pilot-operated check valve 79 closes.

Figure 5:
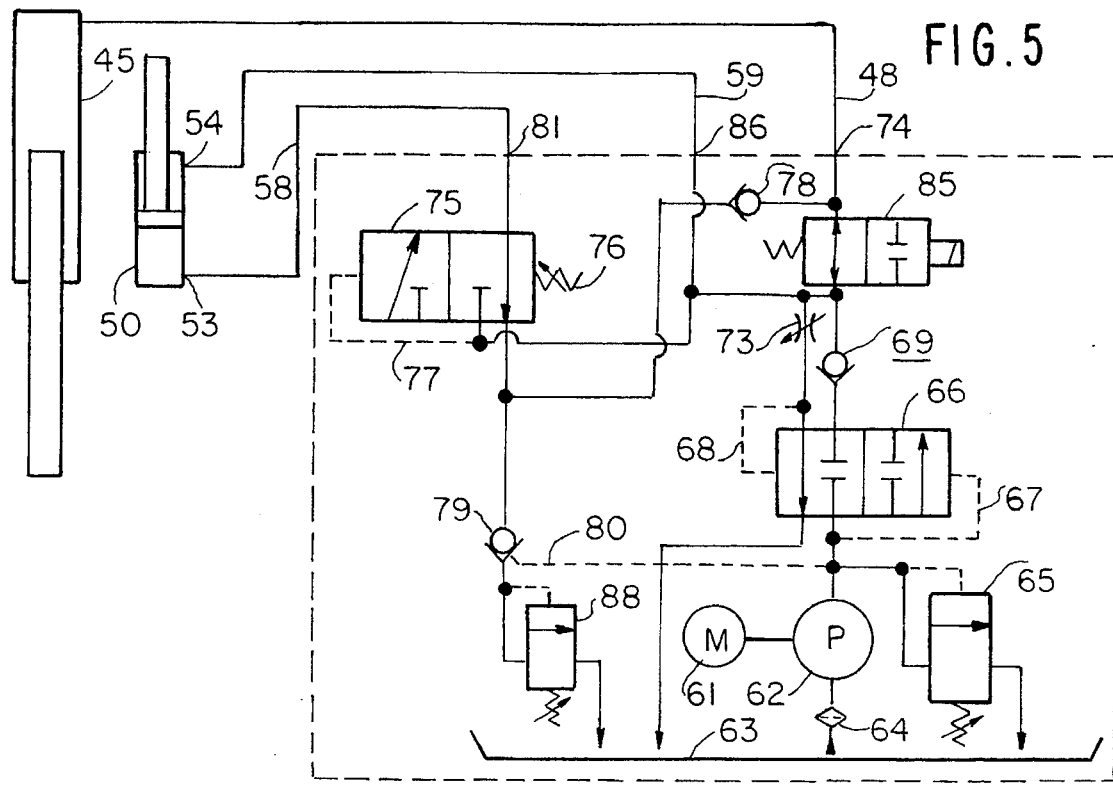
FIG. 5 is a schematic of a dock leveler hydraulic circuit utilizing a check valve, an electric solenoid operated "Emergency Stop" valve and an adjustable lip relief valve in accordance with this invention.

The "Emergency Stop" valve 85, illustrated in FIG. 5 is typically a normally-open electric solenoid valve. When the coil of the valve is energized, the valve closes to prevent the deck assembly from falling and also prevents the check valve 78 from opening. Thus the lip is held extended.

The valve 85, in accordance with another aspect of this invention, can also be used to provide an additional function known as "independent lip extension". Normally the lip cannot extend until the main cylinder 45 has fully extended. Activation of a button, normally denoted "Lip Extend" on the main control panel (not illustrated) will cause the motor to continue to run while the valve 85 is closed. This operation is similar to that illustrated in FIG. 7 but with the valve 85 shifted to the closed position. Flow to the main cylinder will be blocked by the valve 85 and the sequence valve 75 will shift and cause the lip cylinder to extend. In the embodiment illustrated in FIGS. 5–8 the check valve 78 will not allow any hydraulic fluid to flow back into the primary circuit because it is isolated from the lip extend circuit. This is accomplished by having the check valve 78 connected from the lip lock circuit below the sequence valve 75 to the main cylinder port. As a result the entire pump flow is directed to the lip extend port so that the deck assembly remains stationary so that the time to extend the lip is reduced.

Figure 4:
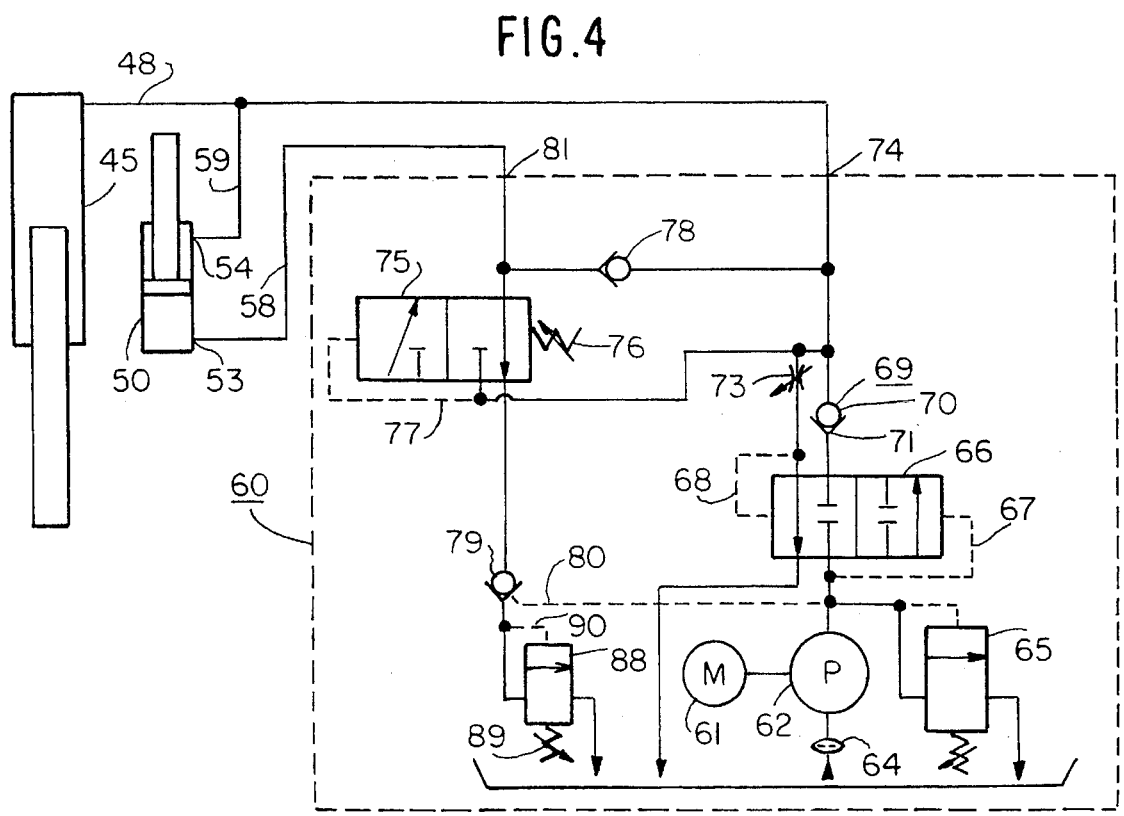
FIG. 4 is a schematic of a dock leveler hydraulic circuit utilizing a check valve and an adjustable lip relief valve in accordance with this invention.

A third port 86 allows the fluid to flow from port 54 of the lip cylinder 50 through line 59 to allow the lip cylinder to extend. If this feature of independent lip extension was not to be provided the hose 59 could be connected directly to the hose 48 as illustrated in FIG. 4 and the port 86 would not be required.

Referring now specifically to FIG. 5, an adjustable relief valve 88 is placed between the pilot-operated lip check valve 79 and the reservoir 63. This valve provides a resistance that is a function of the force exerted by the adjustable spring 89 and is less affected by temperature variations than the resistance provided by a restriction such as a flow control or orifice. The adjustable relief valve 88 is biased by means of the spring 89 to provide a predetermined resistance. A pilot line 90 provides fluid pressure to one side of the valve from the drain side of the sequence valve 75 to provide the force to overcome the spring 89. Unless the fluid pressure in pilot line 90 is higher than the spring force, valve 88 remains closed as illustrated in FIG. 5. The result is that as pilot-operated check valve 79 closes, there will be no loss of fluid from the lip circuit and as a result the lip 40 remains extended, that is there is no droop.

The operation of the system will now be described herein. Referring back to FIG. 5 the operation of the system will be described. A control panel assembly (not illustrated) typically has a "Raise" button and an "Emergency Stop" button. When the operator presses the "Raise" button, the motor 61 drives the pump 62 and hydraulic fluid flows to the shuttle valve 66. Pressure transferred through the pilot line 67 causes the shuttle valve 66 to shift to the position shown in FIG. 6 and hydraulic fluid is allowed to flow through the check valve 69 and to the main cylinder 45 to raise the deck assembly 30. Fluid will flow from the pump 62 through the lip hose 59 to the port 54 on the lip cylinder 50 to urge the lip cylinder 50 to retract and fold the lip 40. Pressure from the pump is transmitted through the pilot line 80 to open the pilot-operated check valve 79. Fluid pressure from the lip cylinder port 53 is then exerted on the pressure relief valve 88 and forces the valve to shift to the open position. Fluid is thus allowed to flow from port 53 on the lip cylinder 50 back through the sequence valve 75, check valve 79 and relief valve 88 to the reservoir 64 and allow the lip 40 to fold.

When the main cylinder 45 is fully extended, the flow cannot continue. The pressure of the fluid increases until it exceeds the force of the spring 76 and fluid flows through the pilot line 77 to shift the sequence valve 75 to the position shown in FIG. 7. Hydraulic fluid then flows from the primary circuit through the sequence valve 75, the power unit port 81, the hose 58 and the port 53 on the lip cylinder 50 to extend the lip. Although equal pressure is applied to both ports of the lip cylinder 50, FIG. 3 illustrates that the area of the piston 52 is greater than the annular area of the piston less the area of the rod 51, and the cylinder 50 will cause the lip 40 to extend. If the operator continues to press the "Raise" button after the lip has fully extended, the pressure will rise and cause the relief valve 65 to open and allow the hydraulic fluid to return to the reservoir 64.

Figure 6:
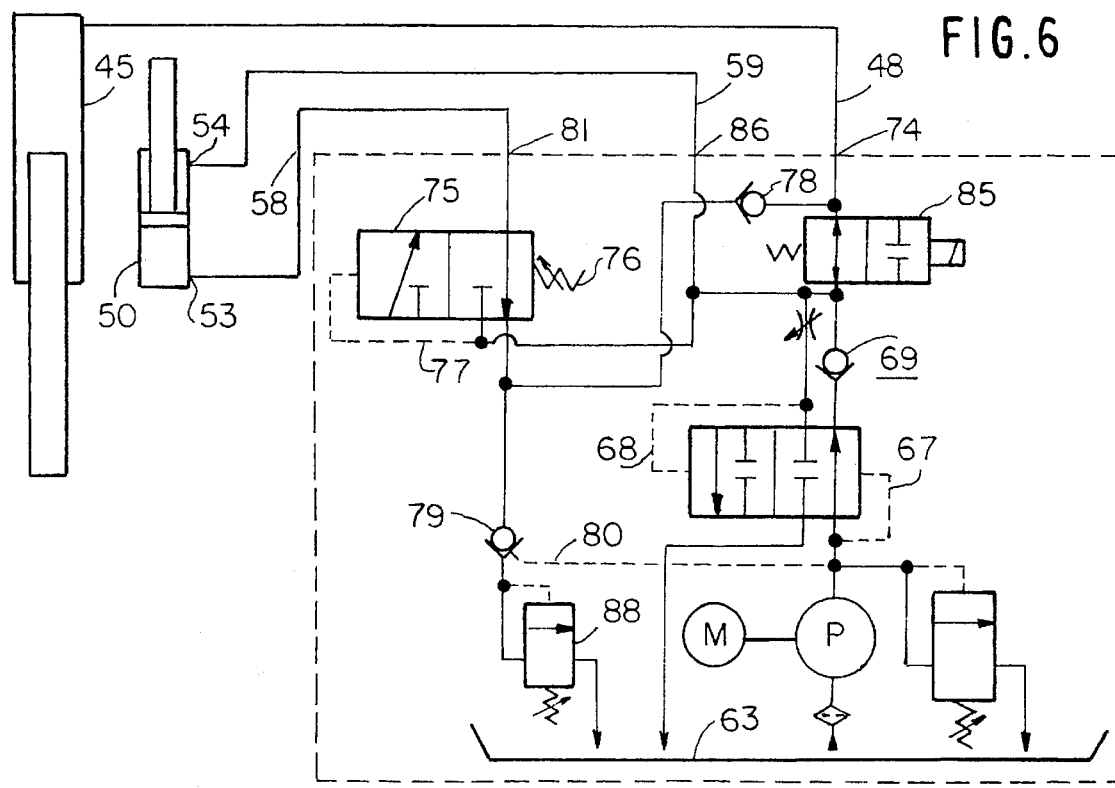
FIG. 6 is a schematic of the dock leveler hydraulic circuit of FIG. 5 with the shuttle valve shifted for a deck raising operation.
Figure 7:
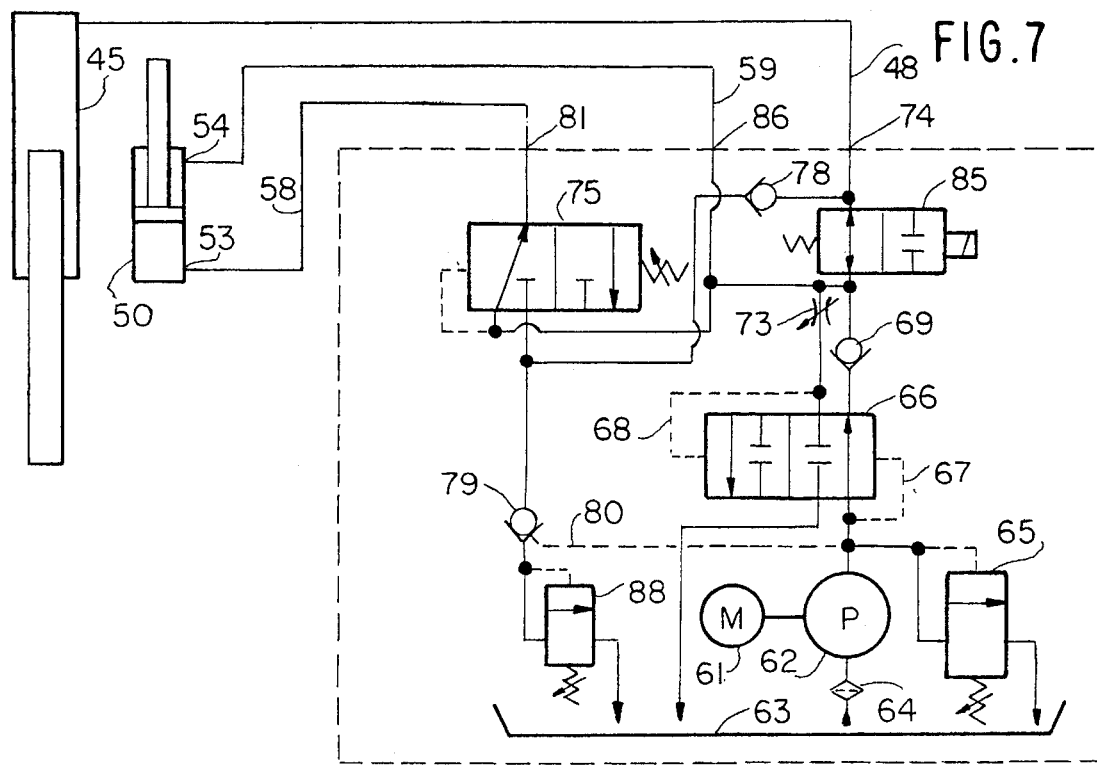
FIG. 7 is a schematic of the dock leveler hydraulic circuit of FIG. 5 with the shuttle valve and sequence valve shifted for a lip extending operation.

When the operator releases the "Raise" button, the motor will stop, the fluid pressure will fall and the spring 76 will force the sequence valve 75 to return to the normal position shown in FIG. 6. Because fluid cannot flow back through the check valve 69, pressure will be transmitted through the pilot line 68 to shift the shuttle valve 66 to the initial position. Flow of hydraulic fluid from the main cylinder 45 will be restricted by the flow control valve 73 so the deck assembly 30 falls at a controlled rate. Also the pilot-operated check valve 79 will close and flow of hydraulic fluid from the port 53 of the lip cylinder 50 will be blocked. As the deck assembly 30 falls, the pressure from the main cylinder will hold the check valve 78 closed and the lip will be held extended until it rests on the truck bed.

The control panel may have a third button, normally denoted "Lip Extend". The operator may decrease the time required to place the leveler on the bed of the truck by extending the lip as soon as it is above the truck bed rather than waiting until the deck cylinder 45 is fully extended. Pressing the "Lip Extend" button causes the valve 85 to close while the motor and pump continue to run. Flow to the main cylinder 45 is blocked and the fluid pressure then increases and causes the sequence valve 75 to shift. Fluid is then directed to port 53 of the lip cylinder causing the lip to extend. When the lip is fully extended the operator releases the button and the operation continues as described previously.

If there is no truck at the dock, the deck assembly 30 will continue to fall until it rests on the ramp stops 24. The pressure in the main cylinder will be diminished and the pressure at port 53 on the lip cylinder 50 will cause the check valve 78 to open and allow the lip to fall by gravity. Allowing the lip to fall when the deck is fully lowered protects the dock leveler from impact damage when the next truck backs into the dock, and also can be used to initialize the auto-return-to-dock function through a limit switch (not illustrated).

In a dock leveler circuit without the relief valve 88 there is flow of fluid from the lip cylinder 50 through the sequence valve 75 and pilot-operated check valve 79 to the reservoir 63 which results in lip droop after the pump stops. This occurs because in any hydraulic circuit there is a finite time delay between the loss of pilot pressure and the closing of a pilot-operated valve. During this delay, some fluid will continue to flow from the lip cylinder and allow the lip to droop. However, with the addition of the adjustable relief valve 88, flow is prevented unless the pressure is high enough to overcome the force of the spring 89, and the lip is held fully extended as the pilot-operated check valve 79 closes.

Figure 8:
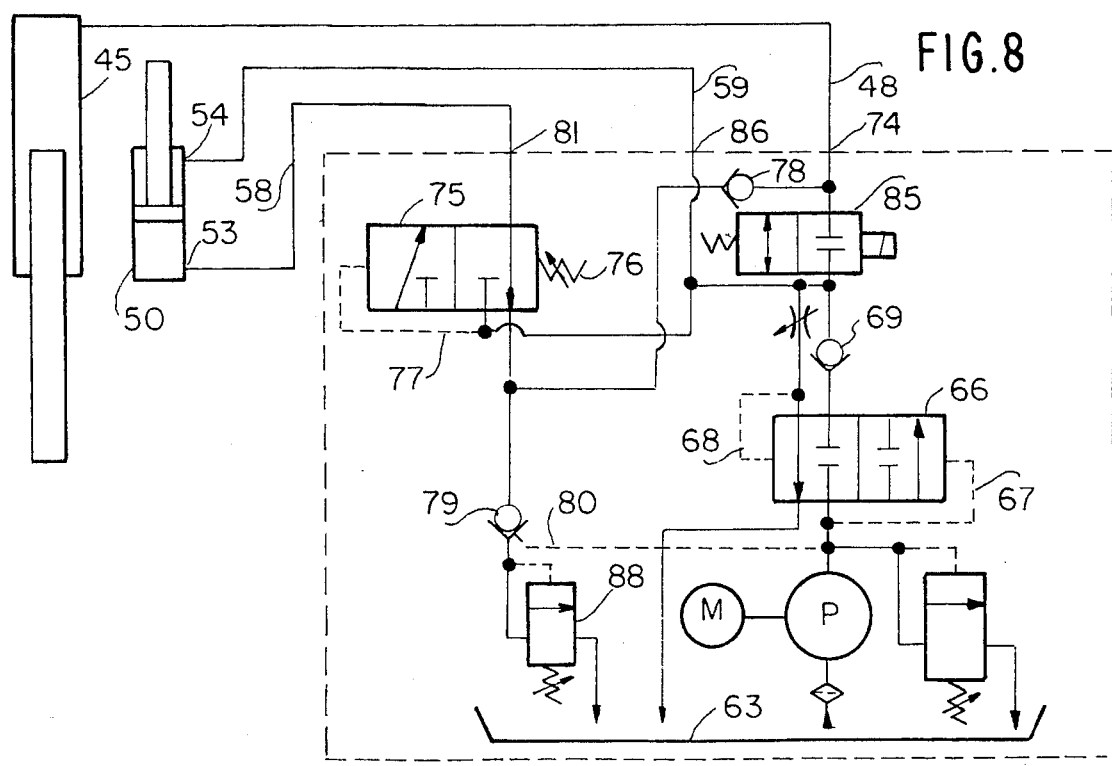
FIG. 8 is a schematic of the dock leveler hydraulic circuit of FIG. 5 with the Emergency Stop valve closed.

If the operator wishes to stop the deck assembly from falling, he may press the "Emergency Stop" button to close the valve 85 as shown schematically in FIG. 8. All flow is thus blocked from both cylinders 45 and 50. When the "Emergency Stop" button is released, the deck assembly will continue to fall but the lip will be held extended.

The deck assembly 30 will continue to fall until the lip 40 rests on the vehicle 10. When loading is completed, the operator will press the "Raise" button and the deck assembly 30 will raise and the hydraulic valves will be in the state shown on FIG. 6. As the deck assembly is raised, the lip 40 will fall by gravity and from pressure from the primary circuit through the hose 59 and the port to 54 retract the cylinder 50. When the lip is fully retracted, the operator will release the "Raise" button and the leveler will fall to the stored position with the end of the lip supported in the lip keepers 24 as shown in FIG. 1.

If the rate of lip retraction is greater than the rate of deck raising, the end of the lip will be forced downward against the bed of the vehicle and this may cause excessive wear of damage to the surface. An adjustable restriction in the lip retract circuit has been used control the rate of lip retraction. However, dock levelers operate in a wide range of temperature conditions. The resistance of a restriction is proportional to flow rate and the viscosity of the fluid. Because hydraulic fluids have viscosities which vary with temperature, the amount of resistance will vary with temperature. Thus the correct setting to control the rate of lip retraction on a hot day may cause such a high resistance on a cold day that the lip will not be fully retracted when the deck assembly is full raised, and the lip will miss the lip keepers when the deck lowers.

The adjustable pressure relief valve 88 solves this problem. It provides a resistance which is set by the spring 89 rather than being proportional to flow rate and the viscosity of the fluid. Although a change in viscosity will have some affect on flow rate, it will be significantly less with the adjustable pressure relief valve 88 than with a flow restriction device.

It will be apparent that modifications of this invention may be practiced without departing from its scope.

I claim:

1. A hydraulic circuit for a dock leveler having a deck powered by a first hydraulic cylinder and lip powered by a second hydraulic cylinder, said hydraulic circuit comprising:

a source of hydraulic fluid, an hydraulic power circuit coupled between said source of hydraulic fluid and said first hydraulic cylinder and said second hydraulic cylinder to control movement of said deck and said lip, said hydraulic power circuit including a pump to deliver fluid under pressure from said source of hydraulic fluid, first valve means operatively coupled to said pump to control fluid flow between said source and said first hydraulic cylinder and said second hydraulic cylinder, second valve means operatively coupled to said first valve means to control fluid flow between said source and said second hydraulic cylinder, a check valve operatively coupled to said second valve means to control fluid flow from said second valve means to said source, and a pressure relief valve coupling said check valve to said source of hydraulic fluid, said pressure relief valve controlling the rate of flow from said second hydraulic cylinder through said check valve as said deck raises and said lip retracts, and said pressure relief valve preventing a flow of fluid from said second hydraulic cylinder as said check valve closes to prevent said lip from drooping after said pump has supplied fluid under pressure through said second valve means to extend said lip.

2. The hydraulic circuit of claim 1, wherein said pressure relief valve comprises an adjustable relief valve having a valve member and an adjustable spring biasing said valve member to a closed position to adjust the force required to permit said relief valve to open at a predetermined pressure.

3. The hydraulic circuit of claim 2 wherein said check valve has a first operative position where flow of hydraulic fluid from said second valve means to the source is prevented when said pump is not operating, and a second operative position whereby said check valve is opened by fluid pressure from said pump to allow fluid to flow from said second valve means to said source, allowing said lip to fall when said deck is raising.

4. The hydraulic circuit of claim 2 wherein said first valve means comprises a shuttle valve receiving fluid under pressure from said pump, said shuttle valve having a first operative position when said pump is running whereby fluid is gated to said first hydraulic cylinder to raise said deck and said shuttle valve having a second operative position when said pump is not running whereby fluid is gated to an adjustable control valve coupled between said first hydraulic cylinder and said source to control the rate of descent of said deck by controlling the rate of return of fluid to said source.

5. The hydraulic circuit of claim 2 wherein said second valve means comprises a sequence valve having two operative positions, a fluidic connection to said first valve means spring biasing said sequence valve to a first operative position so that said lip is allowed to retract as said deck is raised, and a second position of said sequence valve where fluidic pressure from said first valve means exceeds the spring bias such that fluid passes through said second valve means to extend said lip.

6. A hydraulic circuit for a dock leveler having a deck powered by a first hydraulic cylinder and lip powered by a second hydraulic cylinder comprising:

a source of hydraulic fluid, a hydraulic power circuit coupled between said source of hydraulic fluid and said first hydraulic cylinder and said second hydraulic cylinder to control movement of said deck and lip, said hydraulic power circuit including a pump to deliver fluid under pressure from said source of hydraulic fluid, first valve means operatively coupled to said pump to control fluid flow between said source and said first hydraulic cylinder and said second hydraulic cylinder, second valve means operatively coupled to said first valve means to control fluid flow between said source of hydraulic fluid and said second hydraulic cylinder, a first check valve operatively coupled to said second valve means to control fluid flow from said second valve means to said source, a pressure relief valve coupling said first check valve to said source of hydraulic fluid, said pressure relief valve controlling the rate of flow from said second hydraulic cylinder through said first check valve as said deck raises and said lip retracts, and preventing a flow of fluid from said second hydraulic cylinder as said first check valve closes to prevent said lip from drooping after said pump has supplied fluid under pressure through said second valve means to extend said lip, and a second check valve coupled between a return path of said second valve means and said first hydraulic cylinder to permit said lip to fall by gravity after the fluid pressure has decreased in said first hydraulic cylinder.

7. The hydraulic circuit of claim 6 further comprising a stop valve interposed between said first valve means and said first hydraulic cylinder to block the flow of fluid from said hydraulic cylinder.

\* \* \* \* \*